United States Patent
Buravalla et al.

(10) Patent No.: US 9,605,650 B2
(45) Date of Patent: Mar. 28, 2017

(54) WIND BLADES WITH MECHANICAL ELEMENTS FOR PRETENSIONING IN TENSION FABRICS

(71) Applicant: General Electric Company, Schenectady, NY (US)

(72) Inventors: Vidyashankar Ramasastry Buravalla, Karnataka (IN); Sriram Krishnamurthy, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 607 days.

(21) Appl. No.: 14/065,779

(22) Filed: Oct. 29, 2013

(65) Prior Publication Data

US 2014/0154090 A1    Jun. 5, 2014

(30) Foreign Application Priority Data

Dec. 4, 2012 (IN) ........................... 5052/CHE/2012

(51) Int. Cl.
  *F03D 3/06* (2006.01)
  *F03D 1/06* (2006.01)
  *F03D 1/00* (2006.01)

(52) U.S. Cl.
  CPC ........... *F03D 1/0675* (2013.01); *F03D 1/001* (2013.01); *Y02E 10/721* (2013.01); *Y10T 29/49337* (2015.01)

(58) Field of Classification Search
  CPC .................................................. F03D 1/0675
  See application file for complete search history.

(56) References Cited

U.S. PATENT DOCUMENTS

| | | | | |
|---|---|---|---|---|
| 1,886,708 A | * | 11/1932 | Markey | B64C 3/26 244/132 |
| 1,951,353 A | * | 3/1934 | Fulton | B64B 1/58 244/126 |
| 2,086,729 A | * | 7/1937 | Moss | G03B 21/62 106/170.29 |
| 2,164,414 A | * | 7/1939 | Long | B64C 3/26 24/462 |
| 2,455,838 A | * | 12/1948 | Wallis | B64C 3/26 139/425 R |
| 3,332,383 A | * | 7/1967 | Wright | B63H 9/0607 114/102.16 |
| 4,134,708 A | * | 1/1979 | Brauser | F03D 3/0472 290/55 |

(Continued)

*Primary Examiner* — Christopher Verdier
*Assistant Examiner* — Brian O Peters
(74) *Attorney, Agent, or Firm* — GE GLOBAL PATENT OPERATION; Douglas D. Zhang

(57) ABSTRACT

A wind blade is provided. The wind blade includes a self-supporting structural framework, having multiple chord-wise members and one or more span-wise members. Each of the multiple chord-wise members and the one or more span-wise members have an aerodynamic contour. The wind blade also comprises a fabric skin located over the self-supporting structural framework. Further, the wind blade includes a tensioning mechanism configured for providing pretensioning in the fabric skin. The tensioning mechanism includes multiple mechanical force elements coupled with the fabric skin for providing a predetermined force for maintaining an aerodynamic surface of the fabric skin during operation of the wind blade.

17 Claims, 8 Drawing Sheets

(56) References Cited

U.S. PATENT DOCUMENTS

| | | | |
|---|---|---|---|
| 4,191,507 A * | 3/1980 | DeBerg | F03D 3/067 416/117 |
| 4,218,183 A * | 8/1980 | Dall-Winther | F03D 3/067 416/119 |
| 4,389,162 A | 6/1983 | Doellinger et al. | |
| 5,189,976 A | 3/1993 | Cochran et al. | |
| 5,669,758 A | 9/1997 | Williamson | |
| 7,077,628 B1 | 7/2006 | Acord | |
| 7,517,198 B2 * | 4/2009 | Baker | F03D 1/0675 416/227 R |
| 2004/0009063 A1 | 1/2004 | Polacsek | |
| 2008/0069696 A1 | 3/2008 | Ball | |
| 2009/0148290 A1 * | 6/2009 | Garver | F03D 1/0675 416/146 R |
| 2010/0008789 A1 | 1/2010 | Jensen | |
| 2010/0303623 A1 * | 12/2010 | Dawoud | F03D 1/065 416/44 |
| 2011/0036938 A1 | 2/2011 | Blomeley | |
| 2011/0042524 A1 | 2/2011 | Hemmelgarn et al. | |
| 2012/0186730 A1 | 7/2012 | Shindo et al. | |

\* cited by examiner

WIND BLADES WITH MECHANICAL ELEMENTS FOR PRETENSIONING IN TENSION FABRICS

BACKGROUND

The present application relates generally to wind turbines and more particularly relates to wind turbine rotor blades and its accessory systems like flaps, winglets and spoilers, with mechanical elements for pretensioning a tension fabric skin structure.

Most environment friendly energy sources presently available come from wind power that is considered to be one of the cleanest. In this regard, wind turbines have gained increased attention. Wind turbines generate electricity by effectively harnessing energy in the wind via a rotor having a set of rotor blades that turns a gearbox and generator, thereby converting mechanical energy to electrical energy that may be deployed to a utility grid. The construction of a modern wind turbine rotor blade generally includes skin or shell components, span-wise extending spar caps, and one or more shear webs. Present technology uses several molds to fabricate the various pieces of composite wind blade that are bonded together in large resin-infused molds. Such finished blades are relatively heavy and includes a hardened shell encasing the molded hardened shear webs or spar caps. This leads to difficulty in transportation and assembly of the wind blades. Further, the size, shape, and weight of wind blades are factors that contribute to energy efficiencies of wind turbine. In order to reduce the weight of the composite wind blades, a tension fabric skin is being actively considered. One important aspect in the effectiveness of the tension fabric is the pretension in the fabric. This has to be maintained ideally at all operating conditions to obtain both aerodynamic and structural performance. However the fabric is known to loose tension and sag due to creep and other factors. This leads to degraded performance.

There is therefore a desire for a wind blade and method for improved aerodynamic and structural performance of the wind blade. Such wind blades should improve overall system efficiency while being inexpensive to fabricate and providing a long lifetime.

BRIEF DESCRIPTION

In accordance with an embodiment of the invention, a wind blade is provided. The wind blade includes a self-supporting structural framework, having multiple chord-wise members and one or more span-wise members. Each of the multiple chord-wise members and the one or more span-wise members have an aerodynamic contour. The wind blade also comprises a fabric skin located over the self-supporting structural framework. Further, the wind blade includes a tensioning mechanism configured for providing pretensioning in the fabric skin. The tensioning mechanism includes multiple mechanical force elements coupled with the fabric skin for providing a predetermined force for maintaining an aerodynamic surface of the fabric skin during operation of the wind blade.

In accordance with an embodiment of the invention, a method of tensioning a fabric skin of a wind blade is provided. The method includes assembling a fabric skin having a plurality of fabric strips over a self-supporting structural framework having a plurality of chord-wise members and one or more span-wise members, wherein each of the plurality of the chord-wise members and the one or more span-wise members have an aerodynamic contour. The method also includes providing a tensioning mechanism for pretensioning the fabric skin. The tensioning mechanism is configured to couple a plurality of mechanical force elements with the fabric skin for providing a predetermined force for maintaining an aerodynamic surface of the fabric skin during operation of the wind blade.

In accordance with an embodiment of the invention, a wind turbine is provided. The wind turbine includes multiple wind blades, wherein each of the blades comprises a self-supporting structural framework, having multiple chord-wise members and one or more span-wise members. Each of the multiple chord-wise members and the one or more span-wise members have an aerodynamic contour. The wind turbine also includes a fabric skin located over the self-supporting structural framework. The wind turbine further includes a tensioning mechanism configured for providing pretensioning in the fabric skin, wherein the tensioning mechanism comprises a plurality of mechanical force elements coupled with the fabric skin for providing a predetermined force for maintaining an aerodynamic surface of the fabric skin during operation of the wind blade.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
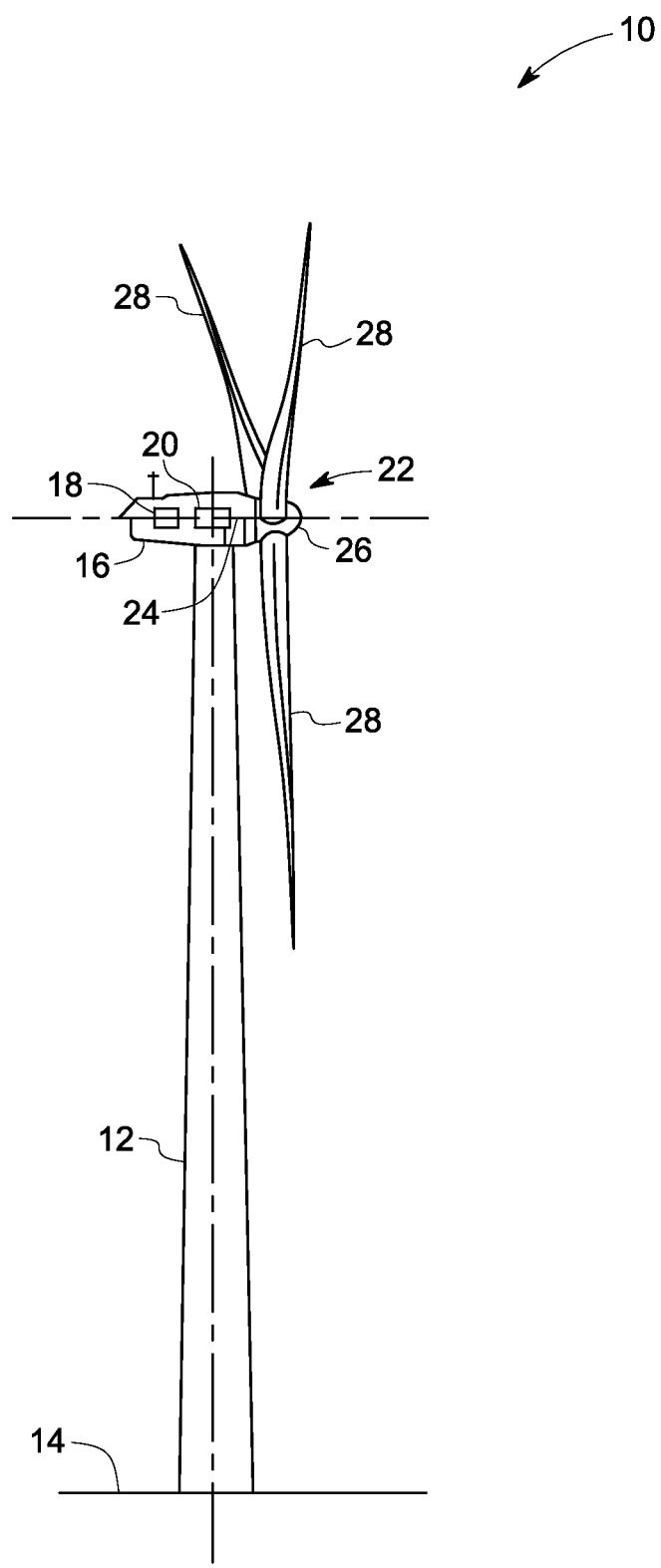
FIG. 1 is a side view of a wind turbine in accordance with an embodiment of the present invention.

FIG. 1 is a perspective view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotatably coupled to the gearbox 20 with a rotor shaft 24. The rotor 22 includes a rotatable hub 26 and at least one rotor blade 28 coupled to and extending outward from the rotatable hub 26.

Figure 2:
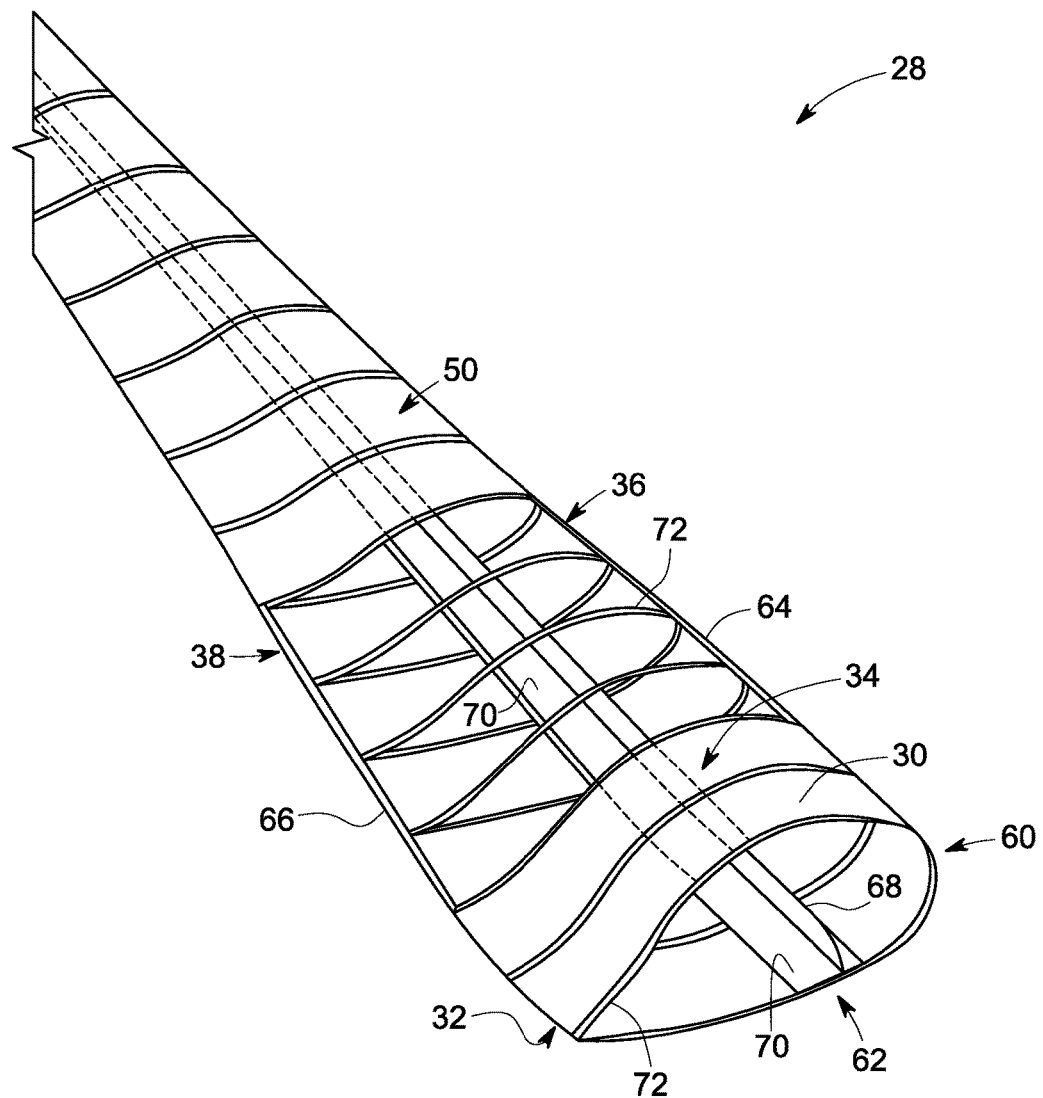
FIG. 2 is a perspective view of the rotor blade with chord-wise and span-wise members and tension fabric skin in accordance with an embodiment of the present invention.

FIG. 2 is a perspective view of a rotor blade 28 in accordance with an embodiment of the present invention. The rotor blade 28 includes a pressure side 32 and a suction side 34 extending between a leading edge 36 and a trailing edge 38, and may extend from a blade tip (not shown) to a blade root (not shown). The exterior surfaces may be generally aerodynamic surfaces having generally aerodynamic contours, as is generally known in the art. The rotor blade 28 further includes a fabric skin 30 with multiple individual fabric sections 50 between the blade tip and the blade root. Each of fabric sections 50 may be uniquely configured so that the multiple fabric sections 50 define a complete rotor blade 28 having a designed aerodynamic profile. For example, each of the fabric sections 50 may have an aerodynamic profile that corresponds to the aerodynamic profile of adjacent section 50. Thus, the aerodynamic profiles of the fabric sections 50 may form a continuous aerodynamic profile of the rotor blade 28.

As illustrated in FIG. 2, the rotor blade 28 includes a self-supporting structural framework 60 that extents span-wise from the blade root (not shown in FIG. 2) towards the blade tip 42 (not shown in FIG. 2). The self-supporting structural framework 60 includes multiple chord-wise members and one or more span-wise members. Each of the multiple chord-wise members and the one or more span-wise members have an aerodynamic contour. As shown, the one or more span-wise members include an internal support structure 62, a leading edge reinforcement member 64 and a trailing edge reinforcement member 66. Further, the internal support structure 62 is formed from a single shear web 68 and associated spar caps 70 that run span-wise along the pressure side 32 and suction side 34 of the blade 28. This internal support structure 62 provides for rigidity and dimensional stability to the wind blade 28. In a non-limiting example, the internal support structure 62 includes a cross-section geometry with an I-beam shape or hat shape, C-shape, U-shape, T-shape, or combinations thereof. The multiple chord-wise members include multiple airfoil shaped reinforcing ribs 72 arranged in chord-wise orientation. The reinforcing ribs 72 are attached to the leading edge reinforcement member 64 on one side, the trailing edge reinforcement member 66 on the other side and spaced along the internal support structure 62. In one embodiment, the multiple chord wise members include multiple airfoil shaped solid or hollow hoops. In one embodiment, the airfoil shaped reinforcing ribs 72 are connected via multiple truss elements (not shown) that provide additional strength to the overall self-supporting structural framework 60 of the wind blade 28.

As shown in FIG. 2, the rotor blade 28 includes the fabric skin 30 with multiple individual fabric sections 50 located over the self-supporting structural framework in a tensioned state to generate an aerodynamic surface. While manufacturing the rotor blade 28, the multiple individual fabric sections 50 are attached to the multiple chord-wise members such as the airfoil shaped reinforcing ribs 72 and/or the one or more span-wise members (shown as the spar caps 70 or the shear web 68) via one or more tensioning mechanisms so as to include a pretension in the fabric skin 30 for generating the aerodynamic surface. The tensioning mechanisms is further required for maintaining tension in the fabric skins during sag or loss in tension during operation of the wind blade. The tensioning mechanisms include multiple mechanical force elements coupled with the fabric skin 30 for providing a predetermined force for maintaining an aerodynamic surface of the fabric skin 30 during operation of the rotor blade 28. In a non-limiting example, the multiple mechanical force elements includes torsion springs, extension springs, turnbuckles, sail-mast apparatus, tension rods, spring cables, superelastic elements and ratchet straps. In one embodiment, the superelastic elements comprises nickel-titanium alloy in a wire form or a spring form that may provide constant force, thereby, maintain constant tensioning of the fabric skin 30. The mechanical force elements are normally coupled with the fabric skin 30 via multiple support members that may include brackets, fabric strips with glued patches, fabric strips with stitched patches, fabric strip extensions with metal rings, and spindles.

Figure 3:
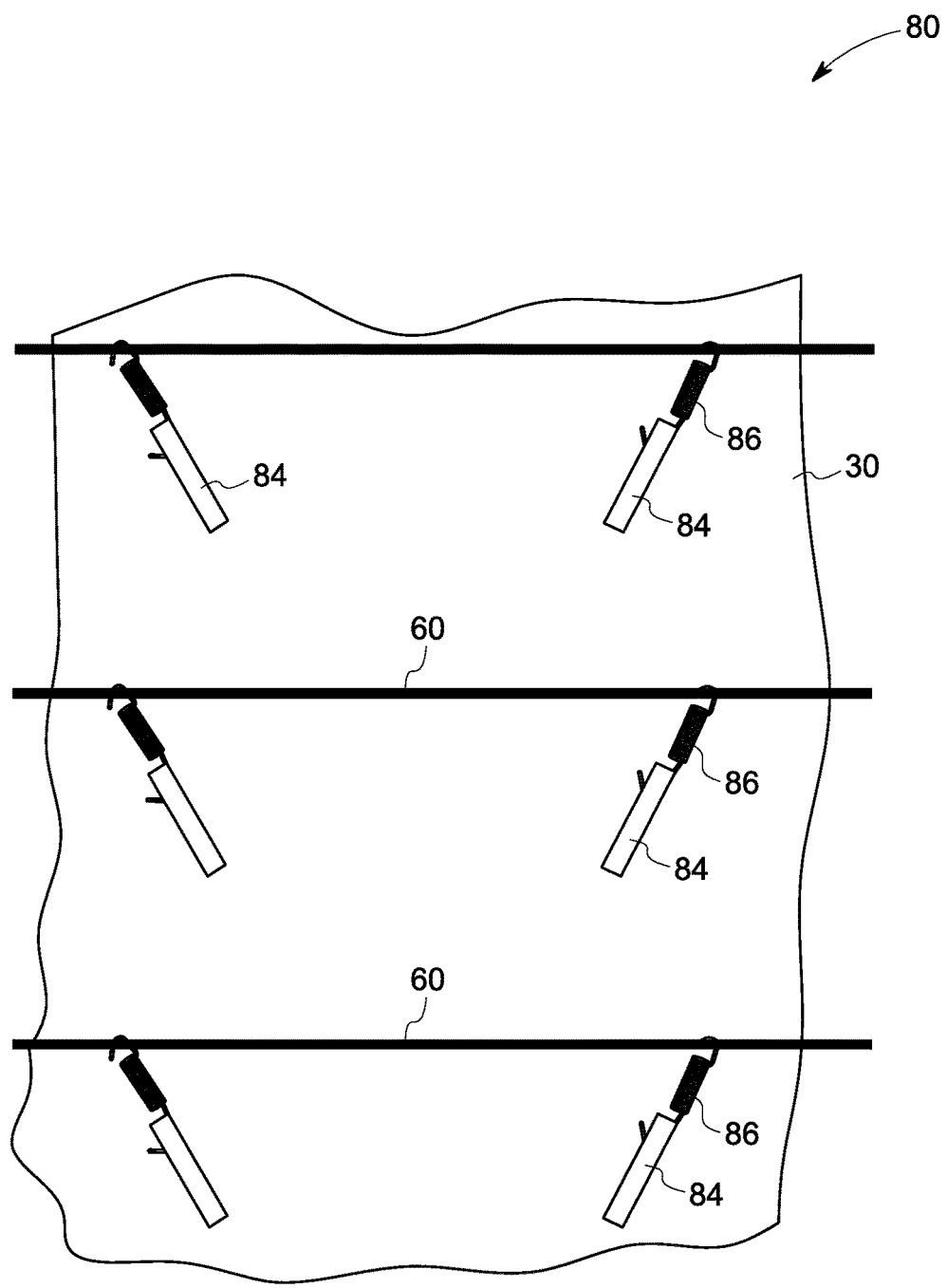
FIG. 3 shows a tensioning mechanism for providing pretension in a fabric skin of a wind blade in accordance with an embodiment of the present invention.

FIG. 3 only shows a tensioning mechanism 80 for providing pretension in the fabric skin 30 of a rotor blade 28 in accordance with an embodiment of the present invention. In this embodiment as shown, the fabric skin 30 includes the tensioning mechanism 80 having multiple support members such as multiple fabric strips 84 that are stitched or glued to the fabric skin 30 at predetermined locations. Further, the tensioning mechanism 80 includes multiple extension springs 86 with hooked ends attached with multiple fabric strips 84 at one first hooked end and coupled with the chord-wise members (shown as reinforcing ribs 72 in FIG. 2) or the one or more span-wise members of the self-supporting structural framework 60 (shown in FIG. 2) at one second hooked end. The multiple extension springs 86 are coupled with the multiple fabric strips 84 and the self-supporting structural framework (shown as 60 in FIG. 2) such that there is a pretension in the fabric skin 30, resulting in aerodynamic profile of the fabric skin 30 of the rotor blade 28. In another embodiment, the tensioning mechanism 80 includes multiple torsion springs coupled with the chord-wise members or the one or more span-wise members at the one first hooked end and coupled directly with the plurality of fabric strips 84 at one second hooked end.

Figure 4:
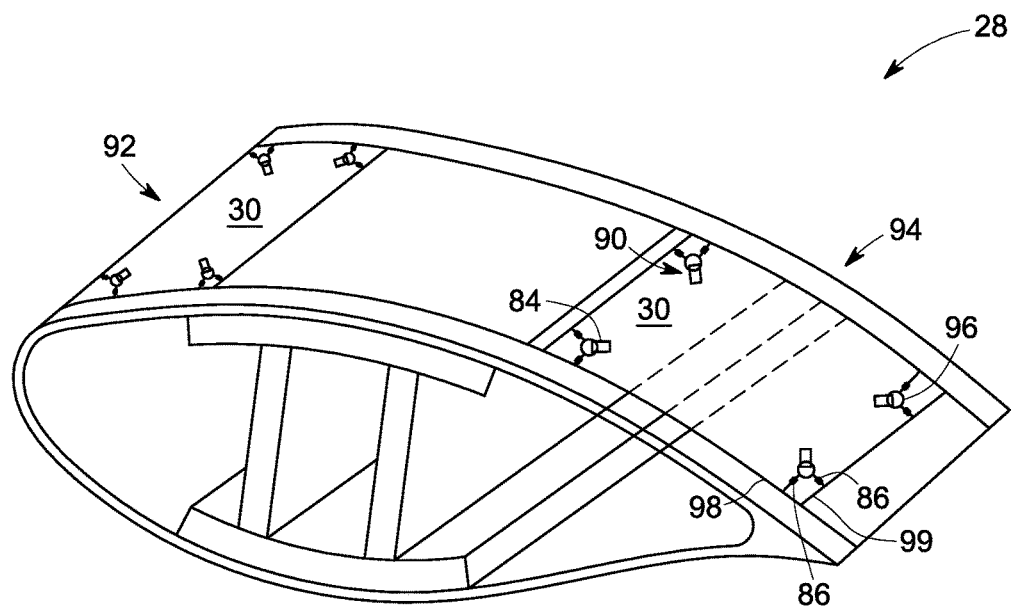
FIG. 4 shows a simplified perspective view of a section of wind blade with a tensioning mechanism for providing pretension in a fabric skin of a wind blade in accordance with an embodiment of the present invention.

FIG. 4 shows a simplified perspective view of a section of the wind blade 28 with a tensioning mechanism 90 for providing pretension in the fabric skin 30 of the wind blade 28 in accordance with an embodiment of the present invention. In this embodiment as shown, the section of the wind blade 28 includes a leading edge fabric section 92 and a trailing edge fabric section 94 arranged with the fabric skin 30 in a tensioned state due to the plurality of tensioning mechanisms 90 arranged at corners of the leading edge fabric section 92 and the trailing edge fabric section 94. Each of the tensioning mechanism 90 includes a metal ring 96 attached to one fabric strip 84 that are stitched or glued to the fabric skin 30 and a plurality of extension springs 86 that are coupled with the chord-wise members (shown as reinforcing ribs 72 in FIG. 2) or the one or more span-wise members (shown as the internal support structure 62 including the spar caps 70 and the shear web 68 in FIG. 2) of the self-supporting structural framework 60 (shown in FIG. 2). Further, the leading edge fabric section 92 and the trailing edge fabric section 94 includes multiple supporting member strips 98, 99 that are attached or stitched with the fabric skin 30. The supporting member strips 98, 99 may in turn be coupled with the self-supporting structural framework 60 of the wind blade 28. The details of the tensioning mechanism 90 are further shown in FIG. 5.

Figure 5:
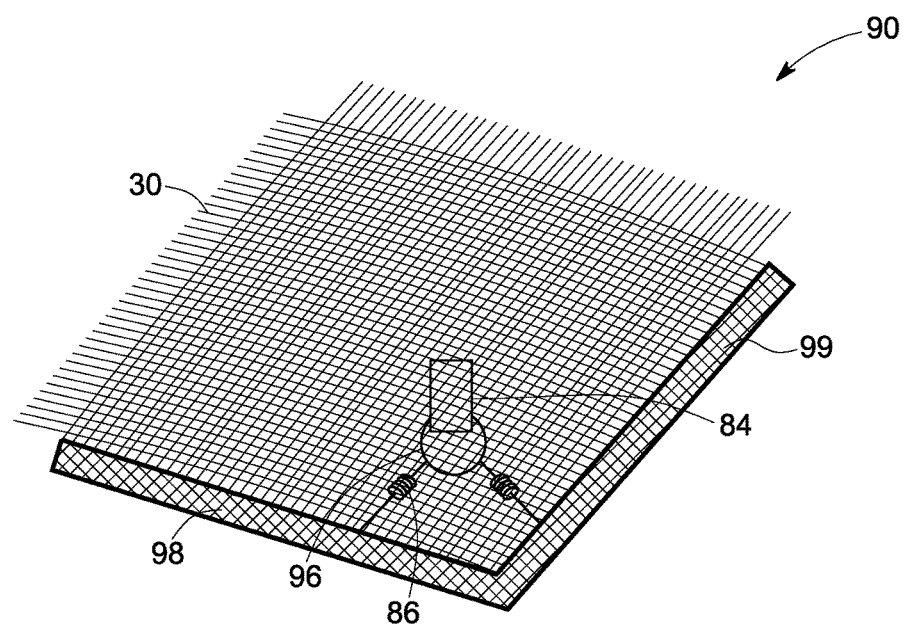
FIG. 5 shows a tensioning mechanism for providing pretension in a fabric skin of a wind blade in accordance with an embodiment of the present invention.

A magnified view of the tensioning mechanism 90 is shown in FIG. 5 illustrating the supporting member strips 98, 99 at sides of the leading edge fabric section 92 and the trailing edge fabric section 94 of the wind blade 28. In one embodiment, the supporting member strip 98 includes a chord-wise supporting member strip 98. In another embodiment, the supporting member strip 99 includes a span-wise supporting member strip 99. In a non-limiting example, both the chord-wise supporting member strip 98 and the span-wise member strip 99 includes a metal strip such as Aluminum or a plastic strip.

Figure 6:
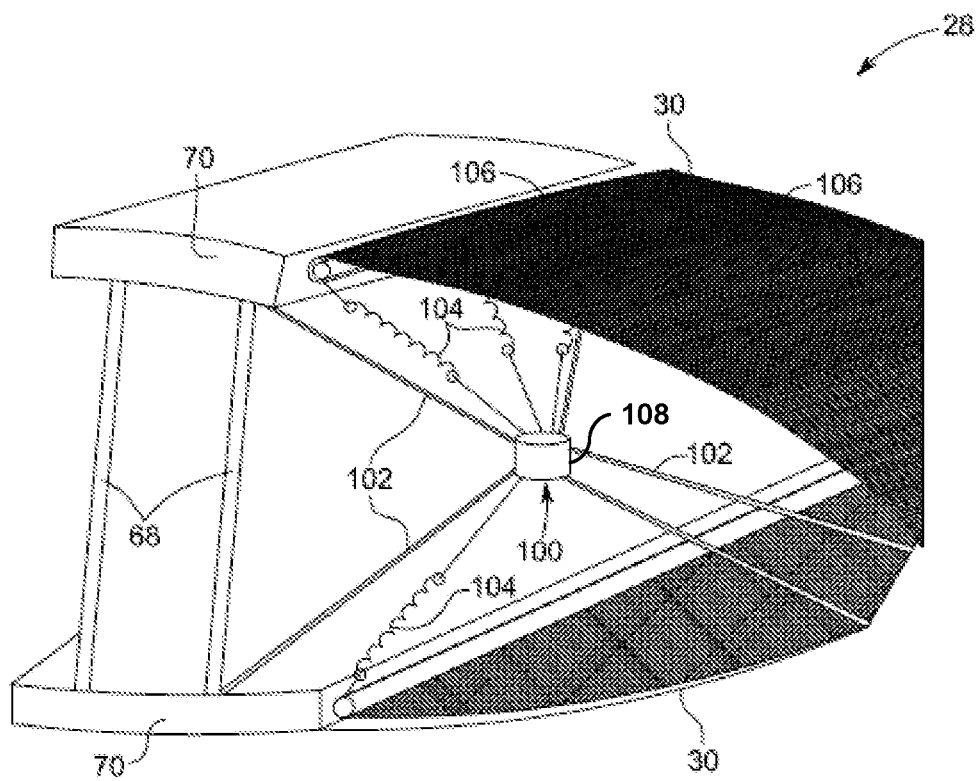
FIG. 6 shows a simplified perspective view of an assembly of a wind blade that includes a tensioning mechanism in accordance with an embodiment of the present invention.

FIG. 6 is a simplified perspective view of a portion of the wind blade 28 that includes a tensioning mechanism 100 in accordance with an embodiment of the present invention. The tensioning mechanism 100 includes an arrangement of multiple tension rods 102, multiple extension springs 104 and multiple umbrella-like wire stiffeners 106 coupled together along with the fabric skin 30 for providing pretension in the fabric skin 30 present in that portion as shown in the wind blade 28. As shown in FIG. 6, the tensioning mechanism 100 is located in the trailing edge portion of the wind blade 28. It is to be understood that the tensioning mechanism 100 may be located in leading edge portions as well as any region of the wind blade 28 where tensioning of the fabric skin 30 is required. Thus there may be multiple tensioning mechanisms 100 located in the wind blade 28. The multiple tension rods 102 and the multiple extension springs 104 of each of each tensioning mechanism 100 are coupled to a central support member 108 at one end and further coupled to the one or more chord-wise members (not shown) or the span-wise members (shear webs 68 and spar caps 70) or the multiple umbrella-like wire stiffeners 106 at the other end. In a non-limiting example, the multiple tension rods 102 and the multiple umbrella-like wire stiffeners 106 may be formed from a metal or a plastic material.

Figure 7:
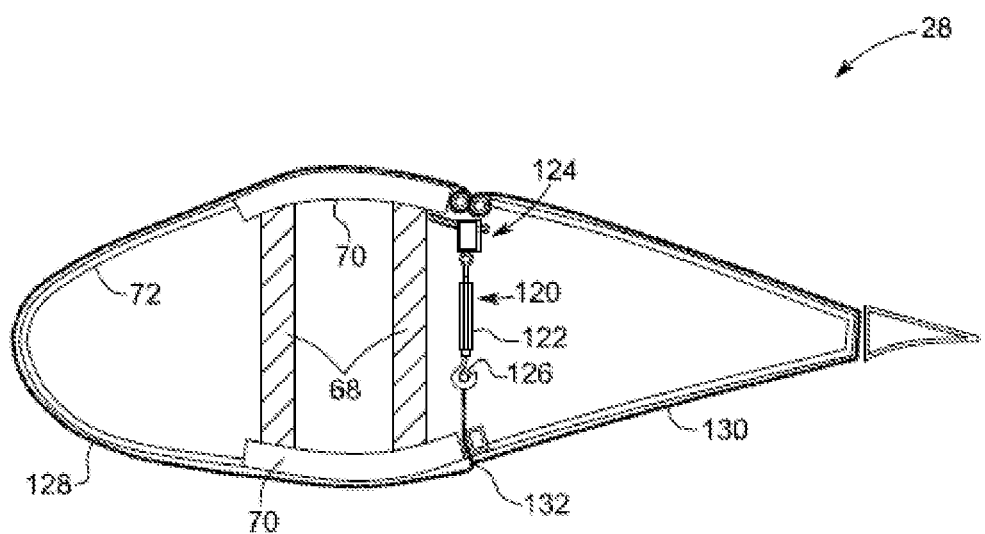
FIG. 7 shows a cross-section side view of the assembly of the wind blade with a tensioning mechanism in accordance with an embodiment of the present invention.

FIG. 7 is a cross-sectional side view of the fabric section (shown as 50 in FIG. 2) of the wind blade 28 with a tensioning mechanism 120 for pretensioning the fabric skin in accordance with an embodiment of the present invention. The tensioning mechanism 120 includes a plurality of turnbuckles 122 coupled to the fabric skin via a metal frame member 124 at one end and hooked with a rigid rod 126 at one second end in a span-wise and chord-wise direction for pretensioning the fabric skin in the wind blade 28. In this embodiment as shown, the fabric section (shown as 50 in FIG. 2) includes a first fabric skin piece 128 at the leading edge and a second fabric skin piece 130 at the trailing edge. As shown, the first fabric skin piece 128 is locked at one end of the top spar cap 70 with the metal frame member 124 and is mounted around the leading edge and inserted in a slot 132 before being attached to the rigid rod 126 within the wind blade 28. Similarly, the second fabric skin piece 130 is locked at one end of the top spar cap 70 with the metal frame member 124 and is mounted around the trailing edge and inserted in the slot 132 before being attached to the rigid rod 126 within the wind blade 28. Both the first and second fabric skin pieces 128, 130 are stitched or riveted or welded with a pocket that holds the rigid rod 126. In one embodiment, the metal frame member 124 includes two slots for accommodating the first and second fabric skin pieces 128, 130 with solid edges. By tightening the turnbuckles 122 the tension is applied in the fabric skin pieces. This tensioning mechanism 120 can be used for tensioning both span-wise and chord-wise directions.

Figure 8:
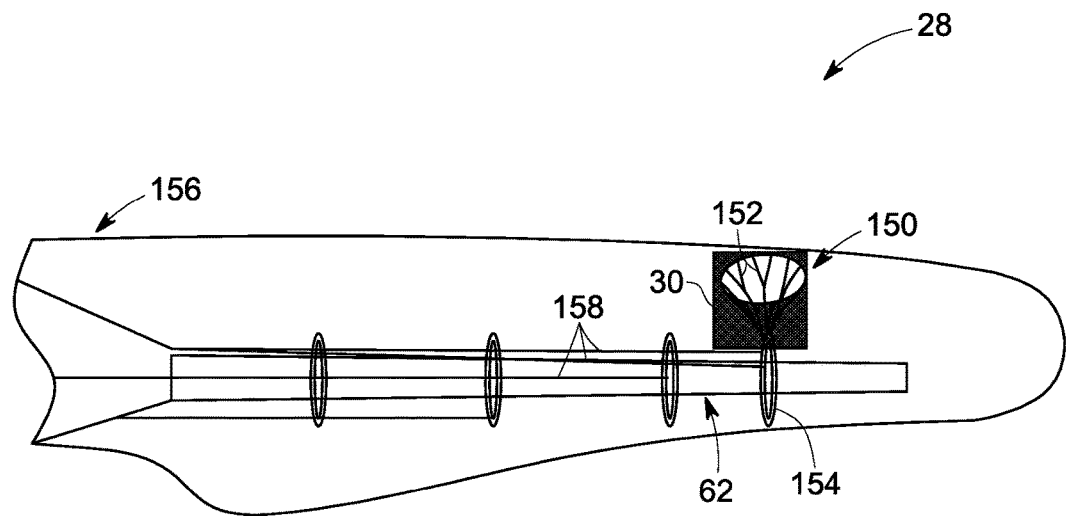
FIG. 8 shows a simplified view of an assembly of a wind blade that includes a tensioning mechanism with cables in accordance with another embodiment of the present invention.

FIG. 8 shows a simplified view of an assembly of the wind blade 28 that includes a tensioning mechanism 150 in accordance with another embodiment of the present invention. The tensioning mechanism 150 includes a combination of a plurality of first springs and cables 152 attached to a plurality of regions of the fabric skin 30 at one end and to a plurality of ring structures 154 at the other end for providing pretensioning of the fabric skin 30. As shown, the plurality of ring structures 154 are arranged in a length-wise direction of the wind blade around the internal support structure (shown as 62 in FIG. 2) and configured to be attached to a root section 156 of the wind blade via a combination of a plurality of second springs and cables 158. In this embodiment, the tension at various regions of the fabric skin 30 can be adjusted independently by a control system (not shown) at the root section 156 of the wind blade 28. The control system may be configured to detect sagging in the fabric skin 30 at one or more areas of the wind blade 28 and provide one or more controllers for pulling a relevant set of the second springs and cables 158 and one or more relevant ring structures 154 that in turn results in pulling of the combination of the first springs and cables 152 at a predetermined region of the wind blade 28.

Figure 9:
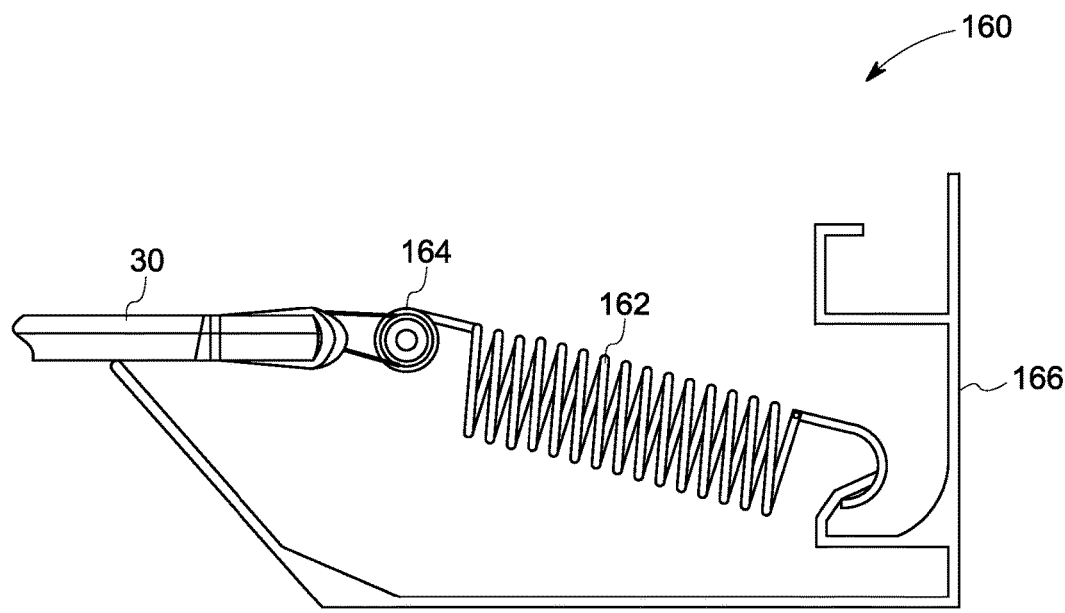
FIG. 9 shows a tensioning mechanism located at multiple locations of the wind blade for providing pretensioning in the fabric skin in accordance with another embodiment of the present invention.
Figure 10:
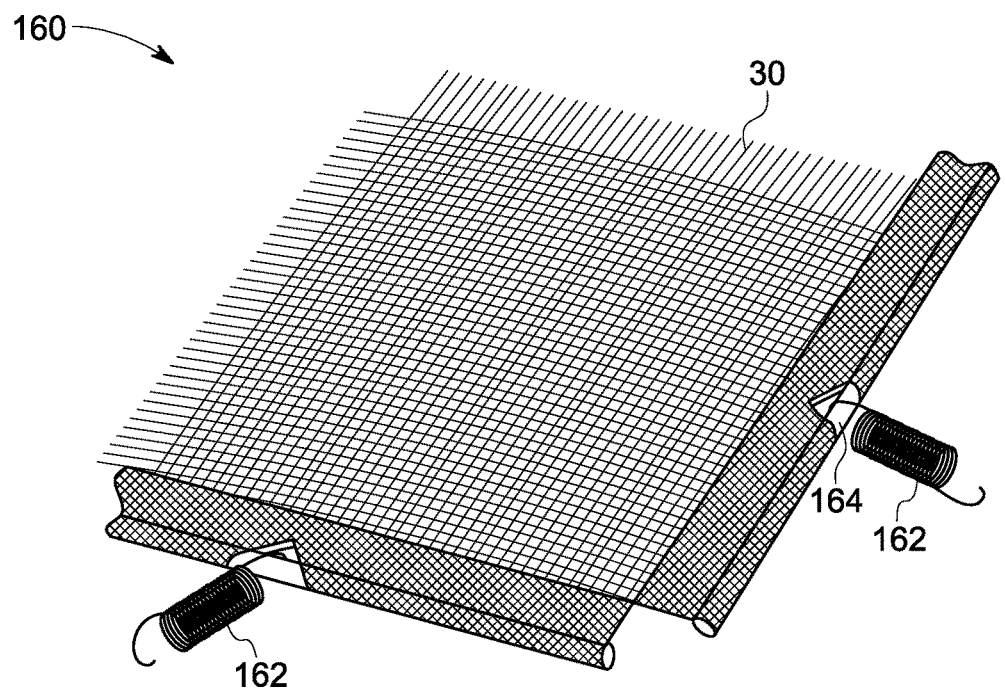
FIG. 10 shows another view of the tensioning mechanism shown in FIG. 9 in accordance with another embodiment of the present invention.

FIG. 9 shows a tensioning mechanism 160 located at multiple locations of the wind blade 28 for providing pretensioning in the fabric skin 30 in accordance with another embodiment of the present invention. The tensioning mechanism 160 includes an extension spring 162 that is hooked with a rigid rod 164 at one end. In one embodiment, the rigid rod 164 may include a span-wise or chord-wise member of the self-supporting structural framework (shown as 60 in FIG. 2) of the wind blade 28. Another end of the extension spring 162 is also hooked to a bracket 166 that is attached with the self-supporting structural framework (shown as 60 in FIG. 2) of the wind blade 28. FIG. 10 shows another view of the tensioning mechanism 160. The fabric skin 30 is stitched or riveted or welded with a pocket that holds the rigid rod 164.

Figure 11:
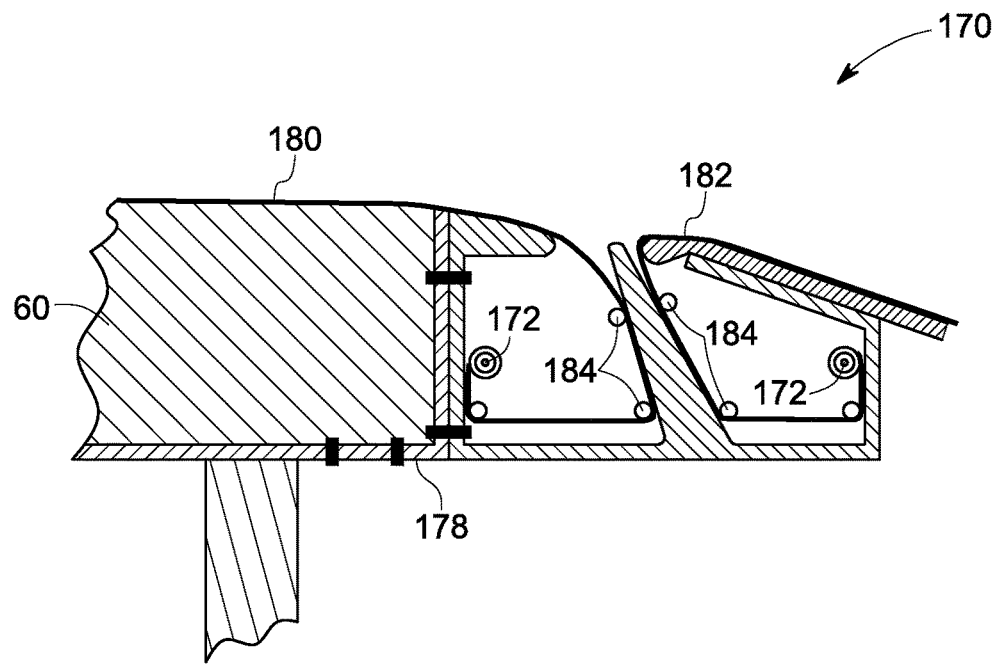
FIG. 11 shows a portion of the wind blade with a tensioning mechanism 170 in accordance with another embodiment of the present invention.

FIG. 11 shows a portion of the wind blade 28 with a tensioning mechanism 170 in accordance with another embodiment of the present invention. The tensioning mechanism 170 includes a plurality of torsion springs 172 placed within spindles 176 and further arranged with a bracket 178 for pretensioning a plurality of fabric sections. The bracket 178 is fixed with the one or more span-wise or chord-wise members of the self-supporting structural framework 60. In this embodiment, the fabric sections include one first fabric skin 180 and one second fabric skin 182 that are mounted over wind blade the leading edge and the trailing edge respectively. The brackets 178 also include a plurality of idlers 184 that provides for smooth rolling of the fabric sections at the corners within the bracket structure.

Figure 12:
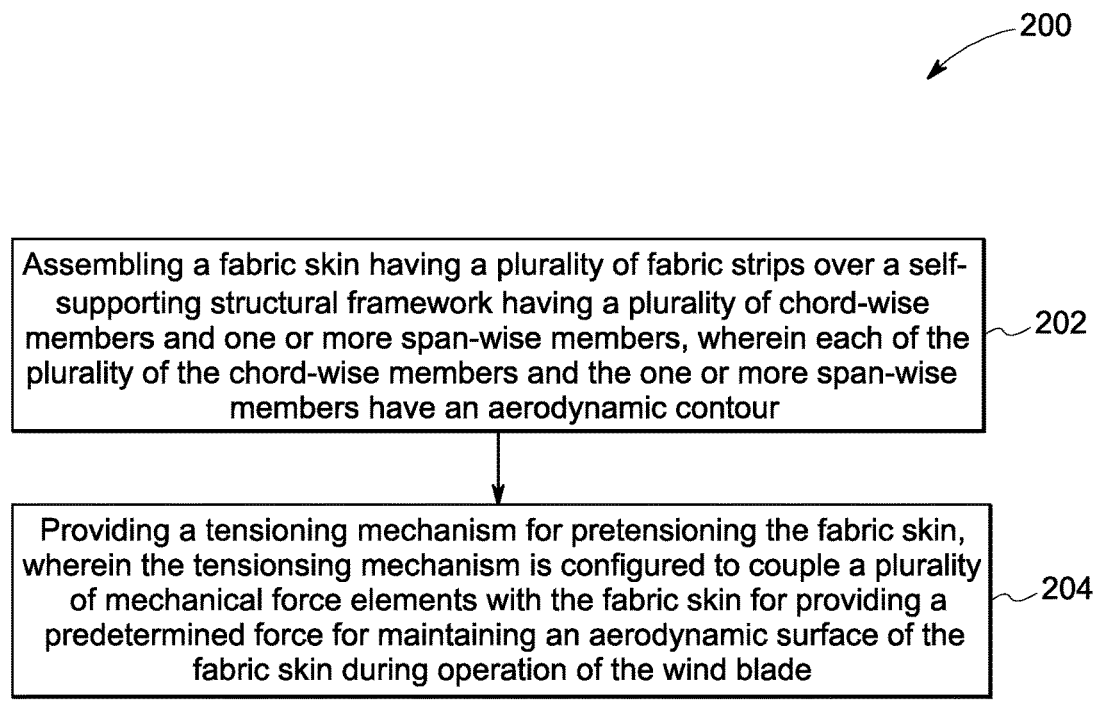
FIG. 12 is flow chart of a method of tensioning a wind blade in accordance with an embodiment of the present invention.

In another embodiment, a tensioning mechanism may include a plurality of ratchet straps attached with the fabric skin and a gear system for locking the ratchet straps tightly for imparting tension in the fabric skin FIG. 12 is flow chart 200 of a method of tensioning a wind blade in accordance with an embodiment of the present invention. At step 202, the method includes assembling a fabric skin having a plurality of fabric strips over a self-supporting structural framework having a plurality of chord-wise members and one or more span-wise members, wherein each of the plurality of the chord-wise members and the one or more span-wise members have an aerodynamic contour. Further, at step 204, the method includes providing a tensioning mechanism for pretensioning the fabric skin. Such tensioning mechanisms is configured to couple a plurality of mechanical force elements with the fabric skin for providing a predetermined force for maintaining an aerodynamic surface of the fabric skin during operation of the wind blade. The plurality of mechanical force elements may include torsion springs, extension springs, turnbuckles, sail-mast apparatus, tension rods, superelastic elements and ratchet straps. The method also includes coupling the plurality of mechanical force elements with the fabric skin via a plurality of support members, wherein the plurality of support members comprises stiffeners, fabric strips with glued patches, fabric strips with stitched patches, fabric strip extensions with metal rings, spring cables, and spindles.

In one embodiment, a wind turbine is provided. The wind turbine includes a plurality of wind blades. Each of the wind blades includes a self-supporting structural framework, having a plurality of chord-wise members and one or more span-wise members, wherein each of the plurality of the chord-wise members and the one or more span-wise members have an aerodynamic contour. The wind blade further includes a fabric skin located over the self-supporting structural framework and a tensioning mechanism configured for providing pretensioning in the fabric skin, wherein the tensioning mechanism comprises a plurality of mechanical force elements coupled with the fabric skin for providing a predetermined force for maintaining an aerodynamic surface of the fabric skin during operation of the wind blade.

Advantageously, the present invention facilitates tensioning of the fabric sections and overcomes the issue of loss of tension in fabric skin during operation of the wind blade over a period of time, thereby maintaining excellent aerodynamic performance. Any loss in tension due to local spring or attachment failure is restricted to that local region of the wind blade, thereby, the overall performance of the wind blade is not compromised. Moreover, the distributed tensioning elements lead to lesser force acting on the individual springs/elements. The present invention is economical and provides for easy assembly of the tensioning mechanisms.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind blade comprising:
   a self-supporting rigid structural framework, having a plurality of chord-wise members and one or more span-wise members, wherein each of the plurality of the chord-wise members and the one or more span-wise members have a rigid aerodynamic contour;
   a pliable fabric skin located over the self-supporting rigid structural framework;
   a plurality of mechanical force elements each having a first end coupled directly or indirectly with the fabric skin, an opposite end coupled directly or indirectly with a member of the self-supporting structural framework, and an intermediate tension device configured between the ends that provides a predetermined force for maintaining an aerodynamic surface of the fabric skin during operation of the wind blade; and
   the fabric skin comprising a plurality of individual fabric sections aligned in a span-wise direction along the structural framework, wherein each fabric section is attached in tension to a plurality of the members of the self-supporting rigid structural framework by the mechanical force elements such that tension in the fabric section is individually and independently maintained during operation of the wind blade.

2. The wind blade of claim 1, wherein the tension device comprises one of a spring device, an elastic device, or an adjustable mechanical device.

3. The wind blade of claim 2, wherein the tension device comprises a nickel-titanium alloy in a wire form or a spring form.

4. The wind blade of claim 1, wherein the first end of each of the plurality of mechanical force elements is coupled with one of the fabric sections via a support member, wherein the support member comprises one of a bracket, a fabric strip with glued patch, a fabric strip with stitched patch, a fabric strip extension with metal ring, or a spindle.

5. The wind blade of claim 1, wherein the tension device comprises a torsion spring or extension spring with a hooked first end attached with one of the plurality of fabric strips that is glued or stitched with the fabric section.

6. The wind blade of claim 5, wherein the torsion spring or extension spring is coupled at its opposite end with the chord-wise member or the span-wise member with a hooked end.

7. The wind blade of claim 5, wherein the torsion spring or extension spring is coupled with one of the plurality of fabric strips with a hooked end via a metal ring.

8. The wind blade of claim 1,
   wherein the tension device comprises a tension rod, extension spring and wire stiffener coupled together with the fabric strip for providing pretension in the fabric skin.

9. The wind blade of claim 1, wherein the tension device comprises a turnbuckle.

10. The wind blade of claim 1, wherein the tension device comprises a combination of a first spring and cable attached to the fabric section at the first end and to a ring structure at the opposite end.

11. The wind blade of claim 1, wherein the tension device comprises an extension spring with a hooked end coupled with rigid rod with attached fabric skin strips at the first end and coupled with a bracket at the opposite end.

12. The wind blade of claim 1, wherein the tension device comprises a torsion spring within a spindle arranged with a bracket.

13. The wind blade of claim 1, wherein the tension device comprises a ratchet strap attached with the fabric section and a gear system for locking the ratchet strap tightly for imparting tension in the fabric skin.

14. A wind turbine comprising:
   a plurality of wind blades, wherein each wind blade is in accordance with claim 1.

15. A method of tensioning a fabric skin of a wind blade, the method comprising:
   assembling a fabric skin having a plurality of individual fabric sections aligned span-wise over a self-supporting rigid structural framework having a plurality of chord-wise members and one or more span-wise members, wherein each of the plurality of the chord-wise members and the one or more span-wise members has a rigid aerodynamic contour; and
   providing a predetermined force for maintaining an aerodynamic surface of the fabric skin during operation of the wind blade with:
      a plurality of mechanical force elements each having a first end coupled directly or indirectly with the fabric skin, an opposite end coupled directly or indirectly with a member of the self-supporting rigid structural framework, and an intermediate tension device configured between the ends; and
   wherein each fabric section is attached in tension to a plurality of the members of the self-supporting rigid structural framework by the mechanical force elements such that tension in the fabric sections is individually and independently maintained during operation of the wind blade.

16. The method of claim 15, wherein the tension device comprises one of a spring device, an elastic device, or an adjustable mechanical device.

17. The method of claim 15, comprising coupling each of the plurality of mechanical force elements with the fabric section via a support member, wherein the support member comprises one of a bracket, a fabric strip with glued patch, a fabric strip with stitched patch, a fabric strip extension with metal ring, or a spindle.

* * * * *

UNITED STATES PATENT AND TRADEMARK OFFICE
CERTIFICATE OF CORRECTION

PATENT NO. : 9,605,650 B2
APPLICATION NO. : 14/065779
DATED : March 28, 2017
INVENTOR(S) : Buravalla et al.

It is certified that error appears in the above-identified patent and that said Letters Patent is hereby corrected as shown below:

In the Claims

In Column 9, Line 7, in Claim 11, delete "fabric skin strips" and insert -- fabric strips --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*